Dec. 8, 1936. R. R. HARRIS Re. 20,198

STEERING APPARATUS FOR MULTIWHEEL VEHICLES

Original Filed Oct. 26, 1932 3 Sheets-Sheet 1

INVENTOR.
ROMAINE R. HARRIS
BY Pinckney Johnson
ATTORNEY

Dec. 8, 1936. R. R. HARRIS Re. 20,198

STEERING APPARATUS FOR MULTIWHEEL VEHICLES

Original Filed Oct. 26, 1932 3 Sheets-Sheet 2

INVENTOR.
ROMAINE R. HARRIS.
BY Lincoln Johnson
ATTORNEY

Dec. 8, 1936. R. R. HARRIS Re. 20,198

STEERING APPARATUS FOR MULTIWHEEL VEHICLES

Original Filed Oct. 26, 1932 3 Sheets-Sheet 3

INVENTOR.
ROMAINE R. HARRIS
BY
ATTORNEY

Reissued Dec. 8, 1936 Re. 20,198

UNITED STATES PATENT OFFICE 20,198

STEERING APPARATUS FOR MULTIWHEEL VEHICLES

Romaine R. Harris, Portland, Oreg.

Original No. 1,990,484, dated February 12, 1935, Serial No. 639,650, October 26, 1932. Application for reissue March 14, 1936, Serial No. 68,799½

18 Claims. (Cl. 280—103)

This invention relates particularly to a steering mechanism for multi-wheel vehicles.

An object of the invention is to provide a multi-wheel vehicle in which each wheel is independently mounted on the vehicle and all of the wheels are connected by a suitable control mechanism for controlling the angular position of the wheels for steering purposes.

A further object of the invention is to provide a multi-wheel vehicle having mechanism thereon for controlling the angular position of the wheels for steering purposes, which mechanism is operated automatically by a suitable connection to a similar multi-wheel vehicle coupled to the forward end of the first mentioned multi-wheel vehicle.

A still further object of the invention is to provide a multi-wheel vehicle in which each wheel is independent of the others so that the individual wheels may be separately driven but the angular position thereof for steering purposes, changed in a definite relationship to the other wheels.

Other objects and advantages are to provide a steering mechanism for multi-wheel vehicles that will be superior in point of simplicity, inexpensiveness of construction, positiveness of operation, and facility and convenience in use and general efficiency.

In this specification and the annexed drawings the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
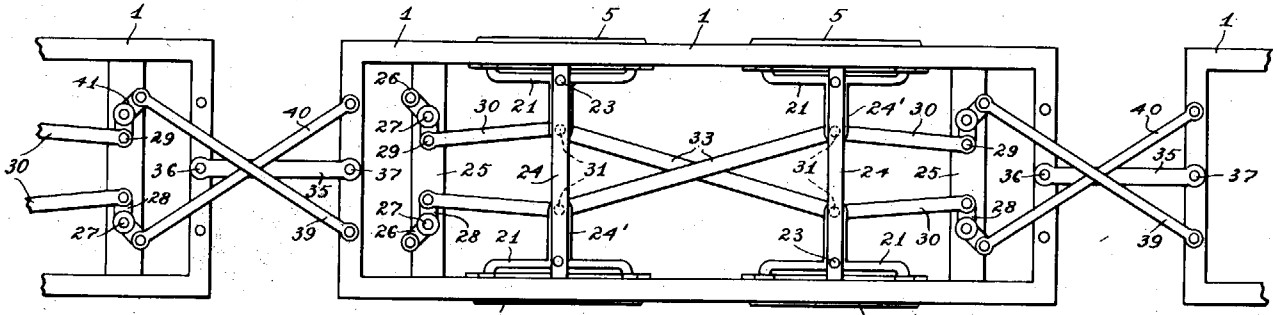
Fig. 1 is a plan view of a multi-wheel vehicle having a steering apparatus thereon constructed in accordance with my invention, and shown in operating relationship to vehicles arranged at the forward and rearward ends thereof.
Figure 2:
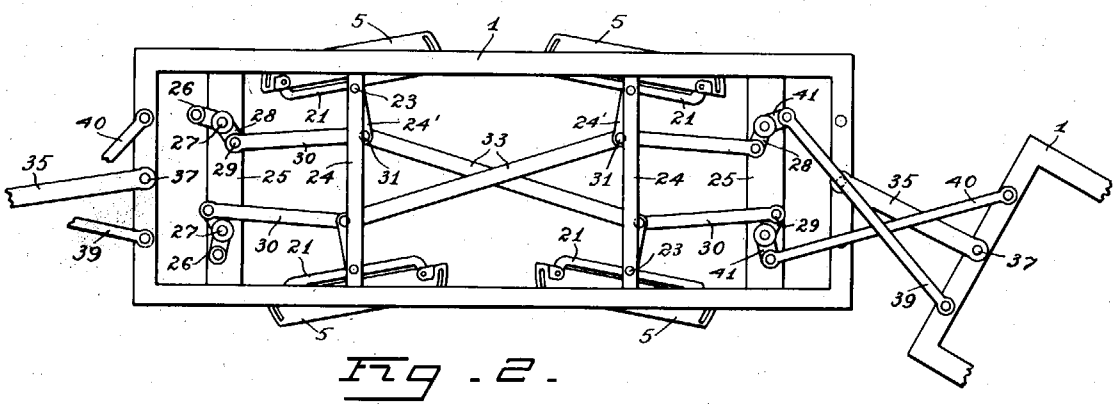
Fig. 2 is a plan view similar to Fig. 1, showing the manner in which the steering apparatus operates.
Figure 3:
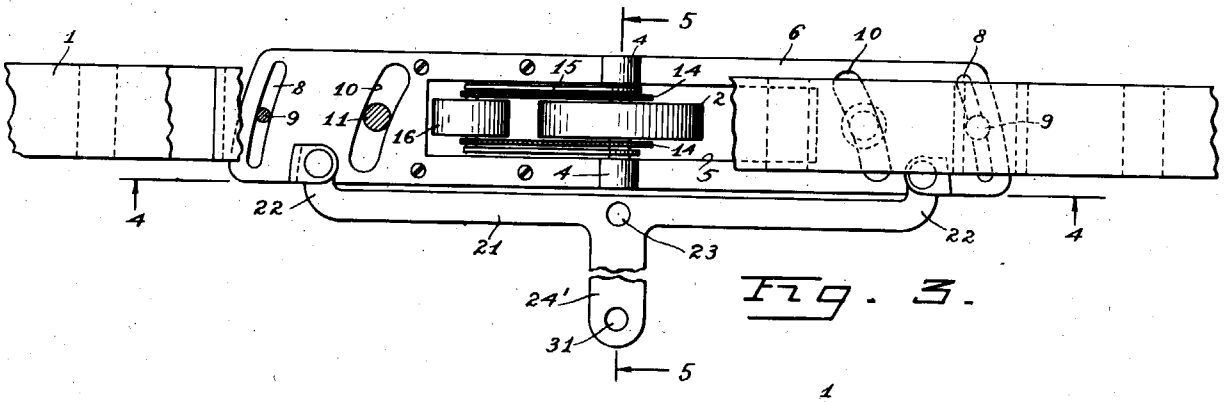
Fig. 3 is an enlarged view partly broken away, showing one of the trucks on which a road wheel is mounted.
Figure 4:
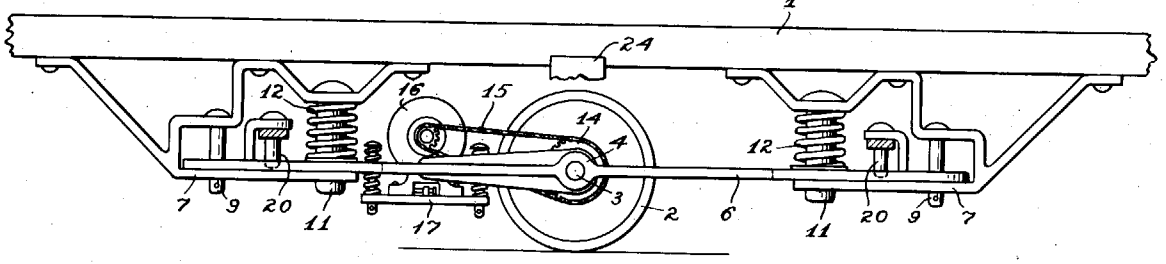
Fig. 4 is a side elevation of Fig. 3 taken on the line 4—4.
Figure 5:
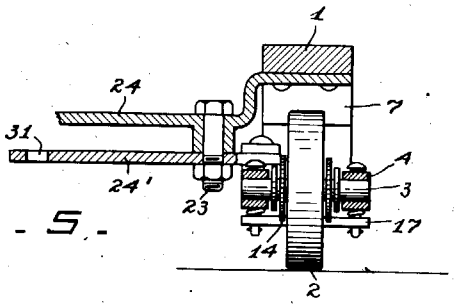
Fig. 5 is a cross section taken thru Fig. 3, on the line 5—5.

In the accompanying drawings I have shown a multi-wheel vehicle consisting of a chassis or frame 1, on which four road wheels 2 are mounted, there being a pair of said wheels at each of the opposite ends of the chassis at corresponding points on opposite sides thereof.

Each road wheel 2 is either keyed or rotatably mounted on an axle 3, the opposite ends of the axle being journaled in bearings 4 supported on a plate 6, the center portion of said plate being cut away as at 5 to receive the road wheel 2 therein. Each road wheel supporting mechanism is a duplicate of the other, and hence a description of but one of such mechanisms will be made, it being understood that said description will apply equally as well to the others.

The wheel supporting plate 6 lies in a substantially horizontal plane and extends thru the horizontal axis about which the road wheel rotates. The opposite ends of the plate 6 rest upon the upper surface of brackets 7, said brackets depending from and being secured to the under side of the chassis 1. A curved or arcuate slot 8 is provided at each of the opposite ends of the plate 6, and a pin 9 is secured in each of the respective brackets 7 and passes thru the slot 8. The slots 8, at the opposite ends of the plate 6 permit said plate 6 to be turned or moved on a horizontal plane into various angular positions, the obvious purpose of which is to change the vertical angular plane of the road wheel 2 for steering purposes. The length of the respective pins 9 is greater than the thickness of the plate 6 to permit raising or lowering movement of the plate 6 in a vertical plane.

Slots 10 are arranged at each of the opposite ends of the plate 6 in spaced relation to the slots 8, the curvature of the slots 10 being struck from the same radius points as the slots 8. A pin 11 secured in each of the respective brackets 7 passes thru each of the respective slots 10, and a compression spring 12 is aranged around each of the pins 11 between the upper surface of the plate 6 and the under side of the bracket 7. The springs 12 at the opposite ends of the plate function as a cushioning medium between the road wheel 2 and the chassis 1, to prevent the transmission of shocks and other disturbances, encountered by the road wheel, to the chassis. Also the load carried by the chassis is transmitted directly to the springs thereby permitting a differentiating effect between the chassis and the mechanism supporting the road wheel. The length of the respective pins 9 and 11 with respect to the thickness of the wheel supporting plate 6, permits free movement between the wheel supporting plate and the chassis in the event the wheel supporting mechanism should move upwardly toward the chassis or the chassis should move downwardly toward the wheel supporting mechanism.

The wheel 2 is provided with a sprocket 14 on either one or both sides thereof, and said sprocket is connected by a drive chain 15 to a motor 16 carried on a bed plate 17 which is resiliently connected to the main plate 6. The motor 16 is preferably an electric motor and receives its energy from a source either carried on the chassis or suitably connected thereto. I do not wish to be limited to the particular form of wheel driving machinism illustrated and described inasmuch as it would be clearly within the purview of the invention to substitute an equivalent form of driving mechanism in lieu thereof.

A pin 20 is provided on the upper side of the center of the wheel carrying plate 6 at each of the opposite ends thereof, said pins 20 being arranged between the respective slots 8 and 10 at each of the opposite ends of the plate 6. A U-shaped yoke member 21 has the legs 22 at each of the opposite ends thereof, slidably guided on the pins 20, and said yoke 21 is pivotally connected at 23 to a bracket 24 on the under side of the chassis 1. The point 23 of pivotal connection between the yoke 21 and the chassis, thus determines the center about which the wheel carrying plate 6 may be swung for imparting a steering effect to the wheel 2. The slots 8 and 10 on the plate 6 are struck on a curve or arc, the radius point of which is the axis of the pivotal connection 23. It would be clearly within the scope of the invention to place the axis of the pivot 23 directly over the vertical center of the wheel 2, or at any other desired point, in which case the arc or curvature of the slots 8 and 10 would be changed accordingly.

An arm 24 extends outwardly from the rear side of the center of the yoke 21 to be connected to the steering mechanism on the chassis 1 to be hereinafter described.

Transverse plates 25 are secured to each of the opposite ends of the chassis 1. A pair of bell cranks 26 are pivoted at 27 to each of the plates 25 and adjacent opposite sides of the chassis. The leg 28 of each bell crank is pivotally connected at 29 to a link 30, said link being pivoted at its free end 31 to the arm 24 on the adjacent plate moving yoke 21. The ends 31 of diagonally opposite links 30 on diagonally opposite wheel steering mechanisms, are interconnected by diagonally extending links 33. It will be noted that the diagonally extended center links 33 cross each other at the proximate longitudinal and lateral center of the chassis 1. The bell cranks 26 at diagonally opposite corners of the chassis 1 are thus connected thru the links 30, 33, and 30, to effect properly related angular movement of the various wheel supporting frames for steering purposes.

In the event the chassis 1 would be coupled in trailing relationship to either a multi-wheel vehicle of the same character ahead of it, or to a different type of towing vehicle, I provide a draw bar 35 which is pivotally connected at 36 on the chassis 1, and pivotally connected at 37, its other end, to the towing or preceding vehicle. The draw bar 35 thus maintains a definite spaced relationship between the chassis 1 and the preceding vehicle. The draw bar 35 is not actually a draw bar inasmuch as each of the wheels 2 on the chassis 1 are separately power driven. The so-called draw bar 35 merely maintains a definite operating relationship between the chassis 1 and the vehicle ahead of it in order that the cross bars 39 and 40 which are pivoted to the rear end of the preceding vehicle may be pivotally connected to the legs 41 on the bell cranks 26. Turning movement of the vehicle preceding the chassis 1, either to the right or to the left, will cause the respective cross bars 39 and 40 to be either pushed or pulled, which pushing or pulling action causes a corresponding movement of the bell cranks 26 on the chassis 1 to which the cross links 38 and 40 are connected, thereby imparting a swinging movement to the wheel supporting frames and the wheels thereon, and a change of the angular position of the wheels thereby causing the wheels on the chassis 1 to follow in the same path or direction as the preceding vehicle.

My particular wheel steering mechanism permits any number of multi-wheel vehicles to be coupled together and insures that all of said vehicles will trail one behind the other in proper alinement, and will eliminate any weaving or yawing of any of the individual vehicles.

It will be noted that the bell cranks at the forward end of the chassis are connected by the cross links 39 and 40 to the rear end of the chassis on the vehicle preceding it and that the bell cranks at the rear end of each vehicle are not connected to the following vehicle. Should it be desirable to reverse the path of travel of the multi-wheel vehicle, the cross bars 39 and 40 would be disconnected from what had been the rear end of the preceding vehicle and the forward end of the following vehicle and transferred to the bell cranks on what had theretofore been the rear end of the preceding vehicle and the forward end of the following vehicle to thereby convert the following vehicle into the preceding vehicle and the preceding vehicle into the following vehicle.

I have found it necessary to connect the diagonally opposite bell cranks by a plurality of links to insure harmonious action and the prevention of contact of parts.

In the modified form of the invention shown in Figs. 6 thru 9, inclusive, I have shown a vehicle generally designated by the numeral 50, having four road wheels 51 on each of the opposite sides thereof. Altho I have shown four road wheels on each side of the said vehicle, if it is to be understood that a greater or lesser number of road wheels might be used.

Each of the road wheels 51 are supported in a truck 52, and each truck at the opposite ends thereof, is provided with a pair of curved slots 53 and 54 respectively. Pins 55 and 56 respectively, on the under side of the chassis, extend downwardly thru the respective slots 53 and 54 to permit of angular or turning movement about a vertical axis that passes thru each wheel 51. Compression springs 58 are interposed between the upper face of each truck 52 and the under side of the vehicle 50. The trucks 52 at opposite ends of the vehicle 50 and at opposite sides thereof, are each provided with a driving motor 59 which is suitably connected by a driving chain 60 to sprockets 61 on the endmost road wheels 51. The middle pairs of road wheels 51 are not power driven.

The U-shaped yoke 62 has its opposite legs pivoted to the opposite ends of each truck 52 at 63 and 64 on the longitudinal center line thereof. Each yoke 62 extends to one side of the truck to which it is pivotally connected.

I have designated the pair of trucks 52 at one end of the vehicle by the letter A; the adjacent pair of trucks by the letter B; the next adjacent trucks by the letter C, and the remaining trucks by the letter D. Adjacent the trucks A I have provided a steering collar 66, which steering collar is movably mounted on the vehicle 50. The steering collar 66 is provided with a pair of projections 67 on diametrically opposite sides thereof. A link 68 connects each of the projections 67 with a mediate portion 69 on the steering yoke 62 on the trucks A. A link 70 is pivotally connected to the aforementioned middle point 69 of the yoke 62 on the trucks A to a mediate portion 71 on the steering yoke 62 on the trucks B. Cross links 72 are pivotally connected at one end to the steering collar 66 and at their other end are pivotally connected at 73 to the mediate portion of the steering yoke 62 on each of the trucks C. Links 74 pivotally connect at 73 to the steering yokes on the trucks C and at their opposite ends said links 74 are pivotally connected at 75 to the middle portion of the steering yokes 62 on the trucks D. The link connections between the steering collar 66 and the various trucks causes the trucks A—B to turn into the same angular position, and the trucks C—D to also turn into the same angular position, with the difference, however, that the angular turning movement of the trucks A—B is opposite to that of the trucks C—D. My particular form of link mechanism for changing the angular position of the trucks, permits the vehicle to turn in a relatively small circle, the diameter of which is not a great deal longer than that of the length of the vehicle.

Figure 6:
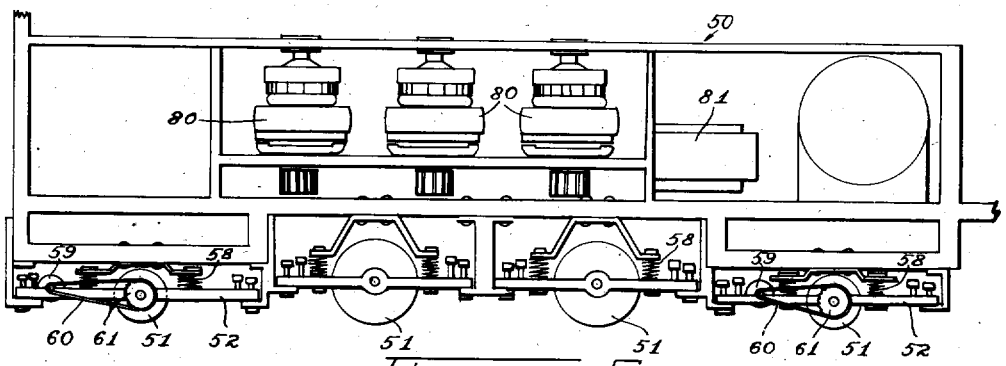
Fig. 6 is a side elevation of a modified form of multi-wheel vehicle.
Figure 8:
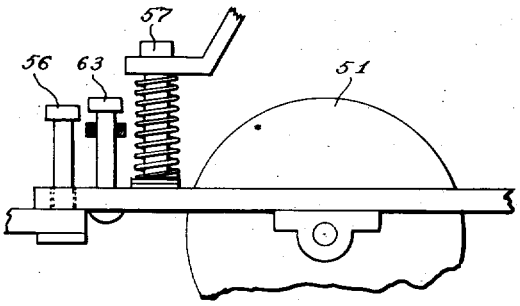
Fig. 8 is an enlarged side elevation of a fragmental portion of one of the non-driven wheel trucks shown in Fig. 6.
Figure 9:
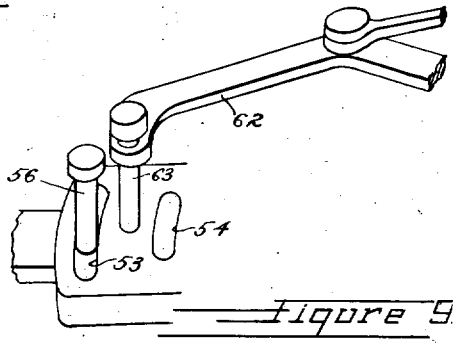
Fig. 9 is a fragmentary perspective of one of the truck moving yokes.
Figure 7:
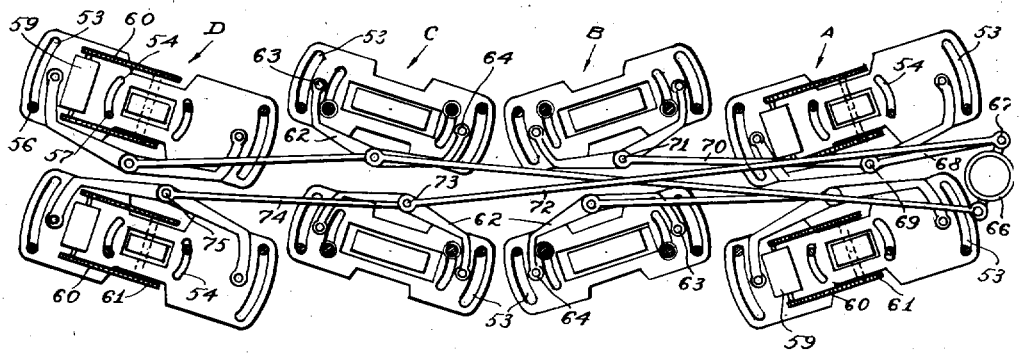
Fig. 7 is a plan view of the wheel supporting trucks shown in Fig. 6, in combination with the steering mechanism therefor.

In Fig. 6 I have shown a plurality of electrical current generators 80, all of which would be actuated by the engine 81 (diagrammatically shown) for supplying electrical energy to the motors 59 on the trucks A—D.

I claim:

1. In a vehicle adapted to be connected to a similar vehicle in trailing alinement, said vehicle being provided with a body and a plurality of dirigible wheel elements, said wheel elements being separately and independently mounted with respect to each other, means for maintaining said wheel elements in predetermined relation with each of the other wheel elements, a coupler element adapted to extend between the vehicle and another in a series and including a pair of stiff crossed members of fixed length, each pivotally connected at its ends to said vehicles, operating connections joining said crossed members, respectively, to the steering elements on said vehicle.

2. In a vehicle adapted to be connected to a similar vehicle in trailing alinement, said vehicle being provided with a body and a plurality of dirigible wheel elements, said wheel elements being separately and independently mounted with respect to each other, each about its own fixed vertical axis, means for maintaining said wheel elements in predetermined relation with each of the other wheel elements, a coupler element adapted to extend between the vehicle and another in a series and including a pair of stiff crossed members of fixed length, each pivotally connected at its ends to said vehicles, operating connections joining said crossed members, respectively, to the steering elements on said vehicle.

3. In a series of vehicles connected in trailing alinement, each vehicle provided with a body and a plurality of dirigible wheel elements, said wheel elements being separately and independently mounted with respect to each other, means for maintaining said wheel elements in predetermined relation with each of the other wheel elements, a coupler element extending between the vehicles in a series and including a pair of stiff crossed members of fixed length, each pivotally connected at its ends to said vehicles, operating connections joining said crossed members, respectively, to the steering elements on the vehicle trailing said members.

4. In a series of vehicles connected in trailing alinement, each vehicle provided with a body and a plurality of dirigible wheel elements, said wheel elements being separately and independently mounted with respect to each other, each about its own fixed vertical axis, means for maintaining said wheel elements, a coupler element extending between the vehicles in a series and including a pair of stiff crossed members of fixed length, each pivotally connected at its ends to said vehicles, operating connections joining said crossed members, respectively, to the steering elements on the vehicle trailing said members.

5. A vehicle including a chassis, a plurality of individual road wheels, a plurality of independent trucks pivotally mounted on the chassis, each truck having a road wheel rotatably mounted thereon, means on each truck to drive the individual wheel thereon, a pair of pivoted members arranged at one end of the chassis, one at each side of the center line thereof, a plurality of links connecting said pivoted members, respectively, to diagonally opposite wheel trucks for controlling the angular position thereof, and a pair of crossed links pivotally connecting the pivoted levers at one end of the chassis to a towing vehicle.

6. A vehicle including a chassis, a plurality of individual road wheels, a plurality of independent trucks pivotally mounted on the chassis, each truck having a road wheel rotatably mounted thereon, a pair of pivoted members arranged at one end of the chassis, one at each side of the centerline thereof, a plurality of links connecting said pivoted members respectively to diagonally opposite wheel trucks for controlling the angular position thereof, and a pair of crossed links pivotally connecting the pivoted members at one end of the chassis to a towing vehicle.

7. A vehicle including a chassis, a plurality of individual road wheels, a plurality of independent trucks pivotally mounted on the chassis, each truck having a road wheel rotatably mounted thereon, means of connection between each truck and the chassis permitting of automatic differentiation in a vertical plane, a pair of pivoted members arranged at one end of the chassis, one at each side of the centerline thereof, a plurality of links connecting said pivoted members, respectively, to diagonally opposite wheel trucks for controlling the angular position thereof and a pair of crossed links pivotally connecting the pivoted levers at one end of the chassis to a towing vehicle.

8. A vehicle including a chassis, a plurality of independent trucks pivotally mounted on the chassis, each truck having a road wheel rotatably mounted thereon, an arm secured to a mediate portion of each wheel truck on one side thereof for swinging said truck, a pair of pivoted members arranged at one end of the chassis, one at each side of the centerline thereof, a plurality of links connecting said pivoted members, respectively, to the arms on each of the diagonally opposite wheel trucks for controlling the angular position thereof and a pair of crossed links pivotally connecting the pivoted levers at one end of the chassis to a towing vehicle.

9. A vehicle including a chassis, a plurality of individual road wheels, a plurality of independent trucks pivotally mounted on the chassis, each truck having a road wheel rotatably mounted thereon, shock absorbing springs interposed between the opposite ends of each truck and the chassis, a pair of pivoted members arranged at one end of the chassis, one at each side of the centerline thereof; a plurality of links connecting said pivoted members, respectively, to diagonally opposite wheel trucks for controlling the angular position thereof; and a pair of crossed links pivotally connecting the pivoted levers at one end of the chassis to a towing vehicle.

10. A vehicle including a chassis, a plurality of swingable wheel carrying trucks, each of said trucks having a pair of spaced guideways therein at each of the opposite ends thereof, a plurality of individual pairs of pins fixed on the chassis and extending thru the guideways in the opposite ends of the trucks to control the swinging movement of the trucks, a link connected to each truck for swinging the same and a single control means connected to all of said links.

11. A vehicle including a chassis, a plurality of swingable wheel carrying trucks, each of said trucks having a pair of spaced guideways therein at each of the opposite ends thereof, a plurality of individual pairs of pins fixed on the chassis and extending thru the guideways in the opposite ends of the trucks to control the swinging movement of the trucks, a pair of pivoted members arranged at one end of the chassis, one at each side of the centerline thereof, a plurality of links connecting said pivoted members, respectively, to diagonally opposite wheel trucks for controlling the angular position thereof, and means connected to the pivoted members for actuating the same.

12. A vehicle including a chassis, a plurality of swingable wheel carrying trucks, each of said trucks having a pair of spaced guideways therein at each of the opposite ends thereof, a plurality of individual pairs of pins fixed on the chassis extending thru the guideways in the opposite ends of the trucks to control the swinging movement of the trucks, a steering yoke connected to opposite ends of each truck on one side thereof, a pair of pivoted members arranged at one end of the chassis, one at each side of the centerline thereof, a plurality of links connecting said pivoted members, respectively, to the yokes on each of the diagonally opposite wheel trucks for controlling the angular position thereof, and means connected to the pivoted members for actuating the same.

13. A vehicle including a chassis, a plurality of individual road wheels, a plurality of independent trucks pivotally mounted on the chassis, each truck having a road wheel rotatably mounted thereon, means of connection between each truck and the chassis permitting automatic differentiation in a vertical plane, a pair of members pivotally mounted at one end of the chassis, one at each side of the centerline thereof, a plurality of links connecting said pivoted members, respectively, to diagonally opposite wheel trucks for controlling the angular position thereof and a pair of crossed links pivotally connecting the members to a towing vehicle.

14. A vehicle including a chassis, a plurality of individual road wheels, a plurality of independent trucks pivotally mounted on the chassis, each truck having a road wheel rotatably mounted thereon, an arm secured to a mediate portion of each wheel truck on one side thereof for swinging said truck, a pair of pivoted members arranged at one end of said chassis, one at each side of the centerline thereof, a plurality of links connecting said pivoted members, respectively, to the arms on each of the diagonally opposite wheel trucks for controlling the angular position thereof, and a pair of crossed links pivotally connecting the pivoted members to a towing vehicle.

15. A vehicle including a chassis, a plurality of individual road wheels, a plurality of independent trucks pivotally mounted on the chassis, each truck having a road wheel rotatably mounted thereon, a pair of swinging levers mounted at one end of the chassis, one at each side of the centerline thereof, a plurality of links connecting said swinging levers, respectively, to diagonally opposite wheel trucks for controlling the angular position thereof, and a pair of crossed links pivotally connecting the swinging levers to a towing vehicle.

16. A vehicle including a chassis, a plurality of individual road wheels, a plurality of independent trucks pivotally mounted on the chassis, each truck having a road wheel rotatably mounted thereon, means of connection between each truck and the chassis permitting automatic differentiation on a vertical plane, a pair of members pivotally mounted on each of the opposite ends of the chassis on opposite sides thereof, a plurality of links connected to diagonally opposite members, said diagonally extended links being pivotally connected to diagonally opposite wheel trucks for controlling the angular position thereof, and a pair of crossed links pivotally connecting the members at one end of the chassis to a towing vehicle.

17. A vehicle including a chassis, a plurality of individual road wheels, a plurality of independent trucks pivotally mounted on the chassis, each truck having a road wheel rotatably mounted thereon, an arm secured to a mediate portion of each wheel truck on one side thereof for swinging said truck, a pair of bell-cranks mounted on each of the opposite ends of the chassis on opposite sides thereof, a plurality of links connected to diagonally opposite bell-cranks, said diagonally extended links being pivotally connected to the arm on each of the diagonally opposite wheel trucks for controlling the angular position thereof and a pair of crossed links pivotally connecting the bell cranks at one end of the chassis to a towing vehicle.

18. A vehicle including a chassis, a plurality of individual road wheels, a plurality of independent trucks pivotally mounted on the chassis, each truck having a road wheel rotatably mounted thereon, a pair of swinging levers mounted on each of the opposite ends of the chassis on opposite sides thereof, a plurality of links connected to diagonally opposite swinging levers, said diagonally extended levers being pivotally connected to diagonally opposite wheel trucks for controlling the angular position thereof, and a pair of crossed links pivotally connecting the swinging levers at one end of the chassis to a towing vehicle.

ROMAINE R. HARRIS.